US012455393B2

(12) United States Patent
Liu et al.

(10) Patent No.: US 12,455,393 B2
(45) Date of Patent: Oct. 28, 2025

(54) SEISMIC ACQUISITION AND PROCESSING WITH A HIGH-SPEED TRAIN SOURCE

(71) Applicant: SAUDI ARABIAN OIL COMPANY, Dhahran (SA)

(72) Inventors: Lu Liu, Beijing (CN); Yi Luo, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 428 days.

(21) Appl. No.: 17/843,521

(22) Filed: Jun. 17, 2022

(65) Prior Publication Data

US 2022/0404516 A1    Dec. 22, 2022

Related U.S. Application Data

(60) Provisional application No. 63/212,041, filed on Jun. 17, 2021.

(51) Int. Cl.
*G01V 1/34* (2006.01)
*G01V 1/143* (2006.01)
(Continued)

(52) U.S. Cl.
CPC .............. *G01V 1/345* (2013.01); *G01V 1/143* (2013.01); *G01V 1/20* (2013.01); *G01V 1/303* (2013.01);
(Continued)

(58) Field of Classification Search
CPC .......... G01V 1/345; G01V 1/143; G01V 1/20; G01V 1/303; G01V 1/364;
(Continued)

(56) References Cited

U.S. PATENT DOCUMENTS

| 2,861,645 A | 11/1958 | White et al. |
| 5,671,136 A | 9/1997 | Willhoit, Jr. |

(Continued)

FOREIGN PATENT DOCUMENTS

| CN | 108594299 A | 9/2018 |
| CN | 109100101 B | 6/2020 |

(Continued)

OTHER PUBLICATIONS

International Search Report issued in PCT/US2022/034019, mailed on Sep. 20, 2022 (6 pages).

(Continued)

*Primary Examiner* — Lee E Rodak
*Assistant Examiner* — Byung Ro Lee
(74) *Attorney, Agent, or Firm* — Osha Bergman Watanabe & Burton LLP (57) ABSTRACT

Systems and a method are disclosed. The method includes obtaining a plurality of raw seismic datasets for a subterranean region of interest, wherein each raw seismic dataset is generated by a high-speed train traversing a train track at a unique speed. The method further includes determining a plurality of processed seismic datasets by processing each of the plurality of raw seismic datasets and determining a final seismic dataset by combining the plurality of processed seismic datasets. The method still further includes identifying subterranean features within the subterranean region of interest using the final seismic dataset.

11 Claims, 11 Drawing Sheets

(51) Int. Cl.
G01V 1/20 (2006.01)
G01V 1/30 (2006.01)
G01V 1/36 (2006.01)

(52) U.S. Cl.
CPC ...... *G01V 1/364* (2013.01); *G01V 2210/1295* (2013.01); *G01V 2210/1425* (2013.01)

(58) Field of Classification Search
CPC ... G01V 2210/1295; G01V 2210/1425; G01V 1/02; G01V 1/003
See application file for complete search history.

(56) References Cited

U.S. PATENT DOCUMENTS

| | | | | |
|---|---|---|---|---|
| 2009/0306895 | A1* | 12/2009 | MacGregor | G01V 11/00 702/6 |
| 2018/0156931 | A1* | 6/2018 | Ahmed | G01V 1/303 |
| 2019/0227186 | A1* | 7/2019 | Gubair | G01V 1/301 |
| 2020/0158898 | A1* | 5/2020 | Le Guern | G01V 1/345 |
| 2020/0363548 | A1* | 11/2020 | Jeong | G01V 1/284 |

FOREIGN PATENT DOCUMENTS

| | | |
|---|---|---|
| CN | 109884694 B | 6/2020 |
| CN | 109959964 B | 10/2020 |
| CN | 114034454 A | 2/2022 |

OTHER PUBLICATIONS

Written Opinion of the International Searching Authority issued in PCT/US2022/034019, mailed on Sep. 20, 2022 (6 pages).

Liu, L et al.; Feasibility study of seismic imaging using high-speed-train signal; American Geophysical Union; Fall Meeting 2019; Abstract No. S33C-0589; Retrieved from the Internet: URL:https://ui.adsabs.harvard.edu/abs/2019; Dec. 9, 2019 (1 page).

Liu, L et al.; "Inversion of vehicle-induced signals based on seismic interferometry and recurrent neural networks"; Geophysics; vol. 86, No. 3, pp. Q37-Q45, Jan. 29, 2021 (9 pages).

Quiros, D. A. et al.; "Seismic interferometry of railroad induced ground motions: body and surface wave imaging"; Geophysical Journal International; vol. 205, No. 1, pp. 301-313; Feb. 19, 2016 (13 pages).

Chen, Qi-fu et al., "Seismic features of vibration induced by train"; Acta Seismologica Sinica; vol. 17, Issue 6, Article ID:1000-9116(2004)06-0715-10; pp. 715-724; Nov. 2004 (10 pages).

Hung, H.-H. et al., "Elastic waves in visco-elastic half-space generated by various vehicle loads"; Soil Dynamics and Earthquake Engineering; vol. 21, Issue 1; pp. 1-17; Jan. 2001 (17 pages).

Okumura, Yohzoh et al., "Statistical Analysis of Field Data of Railway Noise and Vibration Collected in an Urban Area"; Applied Acoustics; vol. 33, Issue 4; pp. 263-280; 1991 (18 pages).

Quiros, Diego A. et al., "Seismic interferometry of railroad induced ground motions: body and surface wave imaging"; Geophysical Journal International; vol. 205, Issue 1; pp. 301-313; Apr. 2016 (13 pages).

Schuster, Gerard T., "Theory of Daylight/Interferometic Imaging: Tutorial"; Proceedings of the 63rd EAGE Conference & Exhibition; pp. 1-5; Jun. 2001 (5 pages).

Schuster, G. T. et al., "Interferometric/daylight seismic imaging"; Geophysical Journal International; vol. 157, Issue 2; pp. 838-852; May 2004 (15 pages).

Yang, Y.B. et al., "Train-induced wave propagation in layered soils using finite/infinite element simulation"; Soil Dynamics and Earthquake Engineering; vol. 23, Issue 4; pp. 263-278; Jun. 1, 2003 (16 pages).

Zhang, Yunhuo et al., "Optimized passive seismic interferometry for bedrock detection: A Singapore case study"; SEG Technical Program Expanded Abstracts 2018; pp. 2506-2510; Aug. 27, 2018 (5 pages).

* cited by examiner

SEISMIC ACQUISITION AND PROCESSING WITH A HIGH-SPEED TRAIN SOURCE

BACKGROUND

Seismic surveys are often performed to characterize a subterranean region of interest. Seismic surveys generate and record seismic waves that travel through the subterranean region of interest, followed by seismic processing, for characterization. A controlled seismic source, such as dynamite, vibroseis, or air gun, is generally required to generate seismic waves. However, a controlled seismic source may be expensive and environmentally disruptive. Following the characterization of a subterranean region of interest, subterranean features may be identified during seismic interpretation. Certain subterranean features, such as an anticline, may indicate the existence of a hydrocarbon reservoir.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes obtaining a plurality of raw seismic datasets for a subterranean region of interest, wherein each raw seismic dataset is generated by a high-speed train traversing a train track at a unique speed. The method further includes determining a plurality of processed seismic datasets by processing each of the plurality of raw seismic datasets and determining a final seismic dataset by combining the plurality of processed seismic datasets. The method still further includes identifying subterranean features within the subterranean region of interest using the final seismic dataset.

In general, in one aspect, embodiments relate to a non-transitory computer readable medium storing instructions executable by a seismic processing system. The instructions include functionality for receiving a plurality of raw seismic datasets for a subterranean region of interest, wherein each raw seismic dataset is generated by a high-speed train traversing a train track at a unique speed. The instructions further include determining a plurality of processed seismic datasets by processing each of the plurality of raw seismic datasets. The instructions still further include determining a final seismic dataset by combining the plurality of processed seismic datasets.

In general, in one aspect, embodiments relate to a system. The system includes a seismic acquisition system comprising an array of seismic receivers configured to record a plurality of raw seismic datasets for a subterranean region of interest, wherein the array of seismic receivers records seismic waves produced by a high-speed train. The system further includes a seismic processing system configured to receive the plurality of raw seismic datasets, wherein each raw seismic dataset is generated by the high-speed train traversing a train track at a unique speed. The seismic processing system is further configured to determine a plurality of processed seismic datasets by processing each of the plurality of raw seismic datasets. The seismic processing system is still further configured to determine a final seismic dataset by combining the plurality of processed seismic datasets. Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to a "processed seismic dataset" includes reference to one or more of such seismic datasets.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-12, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Systems and methods are disclosed for acquiring, processing, and interpreting raw seismic datasets generated by a high-speed train traversing a train track. Each raw seismic dataset is generated by a high-speed train traversing a train track at a unique speed. Each raw seismic dataset may be processed to remove direct waves, deconvolve a seismic wavelet, correct for normal moveout, stack traces, and/or filter artifacts. The processed seismic datasets may be combined to determine a final seismic dataset. Manifestations of subterranean features within the final seismic dataset may be interpreted where certain subterranean features may indicate the presence of a hydrocarbon reservoir within a subterranean region of interest.

Figure 1:
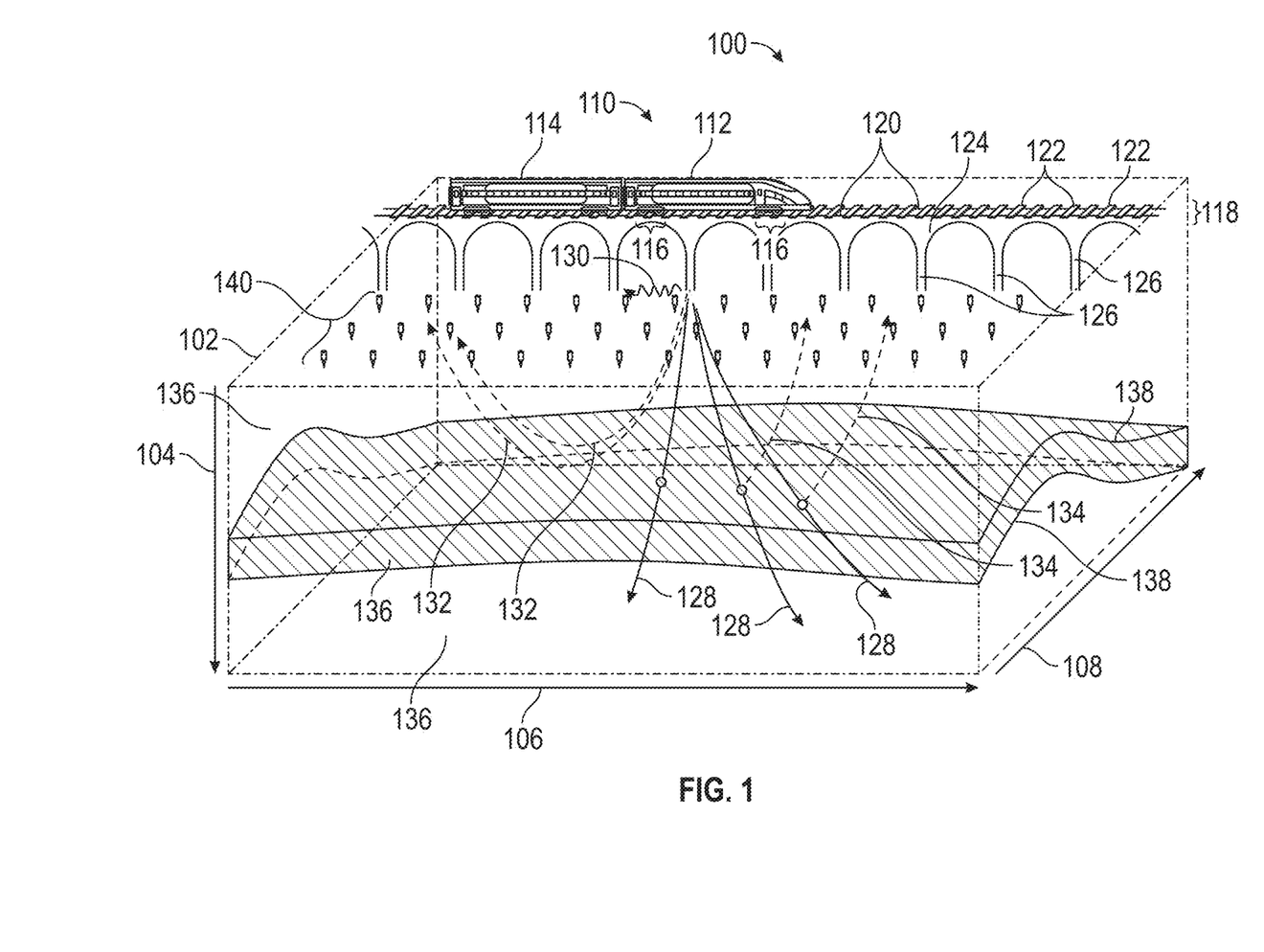
FIG. 1 shows a seismic survey in accordance with one or more embodiments.

FIG. 1 depicts a seismic survey (100) of a subterranean region of interest (102) in accordance with one or more embodiments. The subterranean region of interest (102) may be defined by a fixed coordinate system where three orthogonal axes (104, 106, and 108) are defined relative to a fixed point on the surface of the earth. For example, the first axis 104 may indicate depth, the second axis 106 may indicate latitude, and third axis 108 may indicate longitude. The seismic survey (100) may use a seismic acquisition system, which includes a seismic source. Controlled seismic sources may be dynamite, seismic vibrators (i.e., a "vibroseis truck"), or an air gun. Alternative seismic sources may be moving vehicles, such as high-speed trains (110). Hereinafter, the seismic source is assumed to be a high-speed train (110). The high-speed train (110) may be composed of a control car (112) and a plurality of carriages (such as carriage 114). The control car (112) may contain command and control equipment and workspace for personnel operating the high-speed train (110). Each of the plurality of carriages (114) may be a passenger car or a freight car. The control car (112) and each of the plurality of carriages (114) may be supported by a plurality of wheels (116). A pair of wheels (116) may be supported by an axle. For example, the control car (112) shown in FIG. 1 is supported by four axles, a pair of axles near the front of the control car (112) and a pair of axles near the rear of the control car (112). Each pair of axles is a bogie.

The high-speed train (110) may traverse a train track (118) coupled to the subterranean region of interest (102). The train track (118) may be coupled to the surface of the subterranean region of interest (102) or within the subterranean region of interest (102), such as within a tunnel (not shown). The train track (118) may be composed of two parallel rails (120) resting on top of a plurality of rail sleepers (122) perpendicular to the rails (120). The wheels (116) of a high-speed train (110) may then roll along the rails (120) as it traverses. The rail sleepers (122) may be embedded in a track bed (124) supported by a plurality of piers (126) or other discontinuous structure. The discontinuous structure may be spatially periodic. The track bed (124) may be composed of gravel or small rocks. The plurality of piers (126) or other discontinuous structure may be constructed from reinforced concrete or steel.

A high-speed train (110) traversing a train track (118) may generate radiated seismic waves (128). The radiated seismic waves (128) may travel along the surface of the earth as direct waves (130). Alternatively, the radiated seismic waves (128) may propagate into the subterranean region of interest (102) where the radiated seismic waves (128) may produce refracted seismic waves (132) and reflected seismic waves (134). The reflected seismic waves (134) may pass through one or more rock layers (136) and may reflect one or more times at subterranean boundaries (138) before returning to the surface of the earth.

The seismic waves generated by each source activation may be detected by an array of seismic receivers (140). The array of seismic receivers (140) may include tens of thousands or hundreds of thousands of seismic receivers (140). Each seismic receiver (140) may record seismic waves as a time-series representing the amplitude of ground-motion at a sequence of discrete times. Each time-series may be denoted a seismic "trace".

The location of each wheel (116) on a high-speed train (110) that contacts the train track (118) may be denoted $(x_s, y_s)$ where x and y represent orthogonal axes. The location of each seismic receiver (140) may be denoted $(x_r, y_r)$. Thus, the direct waves (130), refracted seismic waves (132), and reflected seismic waves (134) generated by one source activation may be represented in five-dimensional space as $(x_s, y_s, x_r, y_r, t)$, where t delimits the time sample at which the amplitude of ground-motion was measured by each seismic receiver (140).

A high-speed train (110) may traverse a train track (118) at different speeds. Hereinafter, multiple source activations for a high-speed train (110) traveling at one speed is denoted a "raw seismic dataset". The speed may be an average speed of the high-speed train (110) as the instantaneous speed of the high-speed train (110) may vary as it traverses. Further hereinafter, a "plurality of raw seismic datasets" includes multiple raw seismic datasets where each raw seismic dataset is generated by a high-speed train (110) traversing a train track (118) at a unique speed relative to the other raw seismic datasets within the plurality of raw seismic datasets. For example, a plurality of raw seismic datasets may include three raw seismic datasets. The first raw seismic dataset may be generated by a high-speed train (110) traveling at 125 miles per hour (mph; 200 kilometers per hour (km/hr)); the second raw seismic dataset, at 186 mph (300 km/hr); and the third raw seismic dataset, at 249 mph (400 km/hr).

Figure 2A:
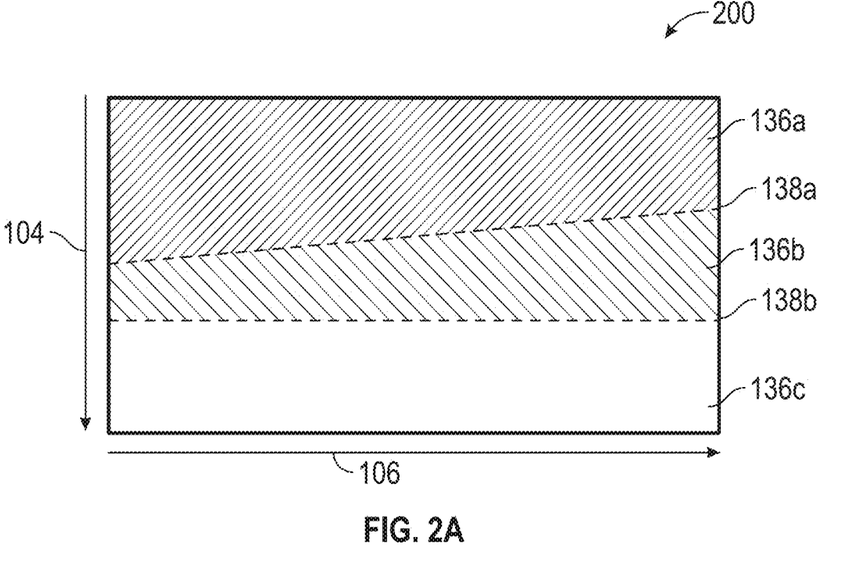
FIG. 2A displays a model in accordance with one or more embodiments.

FIG. 2A displays a model (200) of a two-dimensional slice of a subterranean region of interest (102) in accordance with one or more embodiments. The model (200) presents a vertical two-dimensional slice of a subterranean region of interest (102) where the ordinate represents the first axis (104) and the abscissa represents the second axis (106). The model (200) presents one dipping subterranean boundary (138a) and one flat subterranean boundary (138b) separating three homogeneous rock layers (136a-c).

Figure 2B:
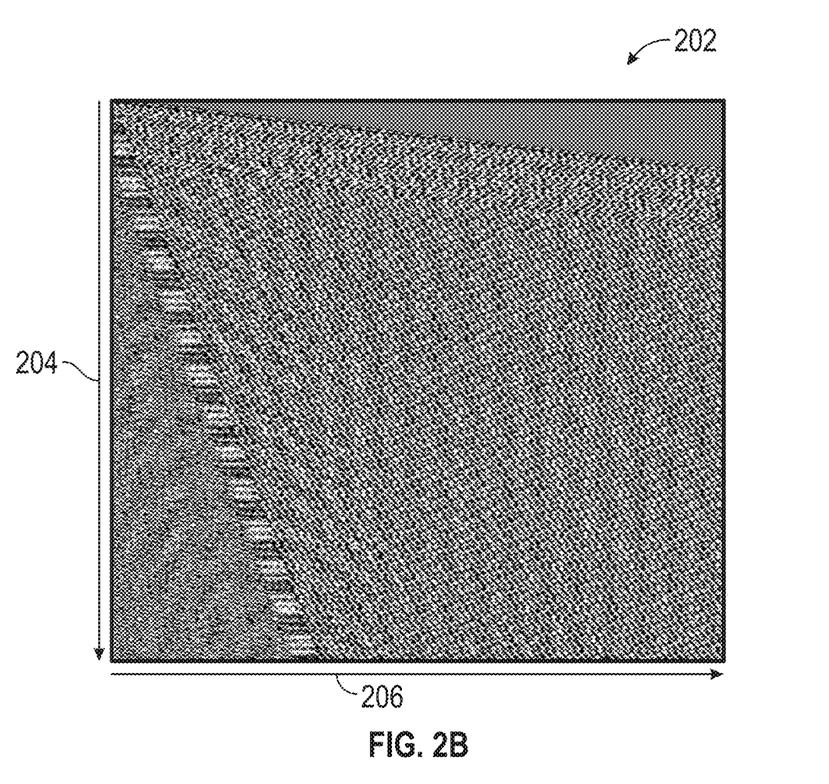
FIG. 2B displays a raw seismic dataset in accordance with one or more embodiments.

FIG. 2B displays a portion of a simulated raw seismic dataset (202) in accordance with one or more embodiments. The simulated raw seismic dataset (202) may be simulated by applying forward modeling techniques to the model (200) in FIG. 2A. Forward modeling techniques may include solving the elastic wave equation or an approximation to the elastic wave equation. Other methods known to one of ordinary skill in the art may also be used. The simulation assumes a high-speed train (110) is traveling at 186 mph (300 km/hr) and a source wavelet for one source activation for one wheel (116) is a 20 Hz Ricker wavelet. In FIG. 2B, the ordinate represents seismic receiver recording time or two-way travel time (204; hereinafter "time") and the abscissa represents seismic source-seismic receiver offset (206) (hereinafter "offset").

The simulated raw seismic dataset (202), and real raw seismic datasets, may present artifacts, such as ringing and noise, that hinder seismic interpretation. Hereinafter, "raw seismic dataset" will be used to denote a simulated raw seismic dataset (202) or a real raw seismic dataset. Seismic interpretation is defined as the process of identifying the manifestation of subterranean features within a seismic dataset. Seismic interpretation is typically performed when a seismic dataset is displayed as an image. Identification may include labeling. And subterranean features may include subterranean boundaries (138) and geologic structures, such as faults and anticlines. The manifestation of subterranean features may present as discontinuities or other anomalies within a seismic dataset. Hereinafter, "subterranean boundary" will be used to describe any subterranean boundary (138) within a subterranean region of interest (102) and any manifestation of a subterranean boundary (138) within any seismic dataset.

To accurately perform seismic interpretation, artifacts may require attenuation and manifestations of subterranean features may require amplification. The process of attenuating artifacts and amplifying manifestations of subterranean features is defined as seismic processing (hereinafter also "processing"). Seismic processing is a workflow that may include multiple processing steps. During processing of a raw seismic dataset (202), unfocused manifestations of subterranean features may become apparent. Once the raw seismic dataset (202) displayed in FIG. 2B completes processing, the processed seismic dataset may present clear, focused manifestations of the dipped subterranean boundary (138a) and the flat subterranean boundary (138b) that are immediately identifiable during seismic interpretation.

Figure 3:
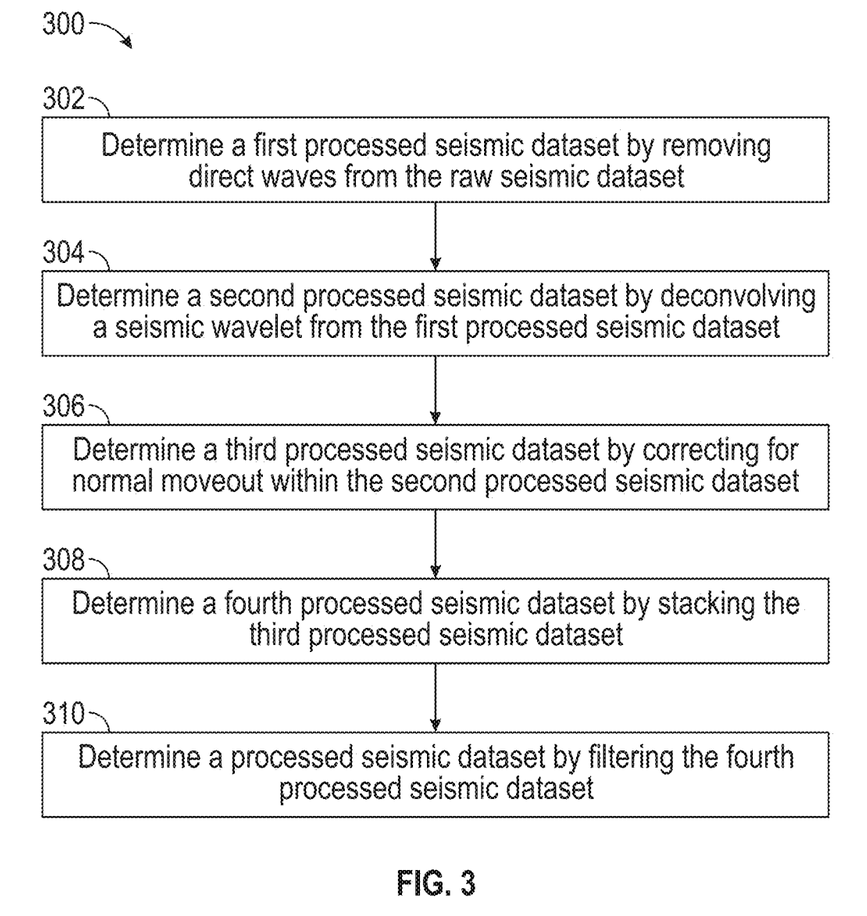
FIG. 3 shows a flowchart in accordance with one or more embodiments.

FIG. 3 shows a first seismic processing flowchart (300) for processing a raw seismic dataset (202) in accordance with one or more embodiments. In step 302, a first processed seismic dataset may be determined by removing or attenuating direct waves (130) from the raw seismic dataset (202). Direct waves (130), also known as surface waves, may travel directly from a high-speed train (110) to a seismic receiver (140) without traveling through a subterranean region of interest (102). Direct waves (130) include Rayleigh waves and Love waves. Further, direct waves may produce ground roll, a type of coherent noise. Direct waves may be removed using a frequency filter, velocity filter, or other methods known to a person of ordinary skill in the art.

In step 304, a second processed seismic dataset may be determined by deconvolving a seismic wavelet from the first processed seismic dataset. The first processed seismic dataset may present a seismic wavelet that introduces ringing artifacts. The seismic wavelet may be estimated using inversion techniques and/or modeling techniques. In some embodiments, the seismic wavelet s may be modeled at each position, x, on the train track (118) such that:

$$s(x,t) = \sum_{j=1}^{N} \sum_{i=1}^{M} \delta\left(t - \frac{x_j}{v} - \frac{d_i}{v}\right),$$ Equation (1)

where t indicates time (204), $x_j$ indicates the distance between the j-th wheel (116) and the head of a carriage (114), $d_i$ indicates the distance between the head of the j-th carriage (114) and x, v is the speed at which the high-speed train (110) is traveling, N is the number of wheels (116) per carriage (114), M is the number of carriages (114) that make up the high-speed train (110), and δ is the Dirac delta-function. Equation (1) assumes a seismic wavelet is excited each time a wheel (116) contacts a point on the train track (118) and that the amplitude of the seismic wavelet for every point on the train track (118) is uncorrelated. Equation (1), thus, accounts for multiple carriages (114), multiple wheels (116), and continuous contact of each wheel (116) with the train track (118).

Removing the seismic wavelet from the first processed seismic dataset may be performed using deconvolution. Deconvolution may be performed deterministically or statistically using methods well known to one of ordinary skill in the art.

In step 306, a third processed seismic dataset may be determined from the second processed seismic dataset by correcting for the variation of offset (206) in the arrival time of reflected seismic waves (134). For example, "normal moveout" is the relationship between arrival time of a reflected seismic wave (134) that reflected from a flat subterranean boundary (138b) and offset (206) described by a hyperbolic equation. The hyperbolic variation occurs due to the variable separation distance between a seismic source (i.e., a high-speed train (110)) and seismic receiver (140) pair (i.e., offset (206)). In some embodiments, normal moveout may be corrected such that uncorrected or observed arrival time, T (x), may be:

$$T(x) = tt(x_i) + \sqrt{\frac{(x-x_i)^2}{v^2} + (t_0 - tt(x_i))^2},$$ Equation (2)

where $x_i$ is the current position of the head of the high-speed train (110), $tt(x_i)$ is the arrival time of the high-speed train (110) at $x_i$, x is the seismic receiver (140) location, and $t_0$ is a normal moveout-corrected two-way vertical travel time. The term v is a trial seismic wave propagation velocity that may be varied to determine the true seismic wave propagation velocity in the subterranean region of interest (102). When the trial seismic wave propagation velocity v is similar to the true seismic wave propagation velocity in the subterranean region of interest (102), the reflected seismic waves (134) may no longer vary for offset (206). In other embodiments, moveout may be corrected using a seismic velocity model or using any other method known to a person of ordinary skill in the art.

In step 308, a fourth processed seismic dataset may be determined by stacking the traces within the third processed seismic dataset. Stacking may be defined as the summation of traces. Stacking may enhance the signal-to-noise ratio. If a high-speed train (110) traverses a train track (118) supported by a discontinuous structure, such as piers (126), stacking may cause constructive interference. Alternatively, if a high-speed train (110) traverse a train track (118) supported by a continuous structure, stacking may cause destructive interference.

In step 310, a processed seismic dataset may be determined by filtering the fourth processed seismic dataset. The fourth processed seismic dataset may be filtered using a frequency-wavenumber filter or any other filter known to a person of ordinary skill in the art.

While the seismic processing steps described in FIG. 3 are presented as a linear sequence, a person of ordinary skill in the art will understand that each step of the first seismic processing flowchart (300) is subject to review and quality control steps each of which may be automatic, statistical, and/or manual. For this reason, among others, some seismic processing steps described in FIG. 3 may be repeated immediately or at a later point in the sequence to produce an improved, refined, and/or updated processed seismic dataset. However, FIGS. 4, 5A, 5B, 6, and 7 described below follow the first seismic processing workflow (300) without repeated seismic processing steps.

Figure 4:
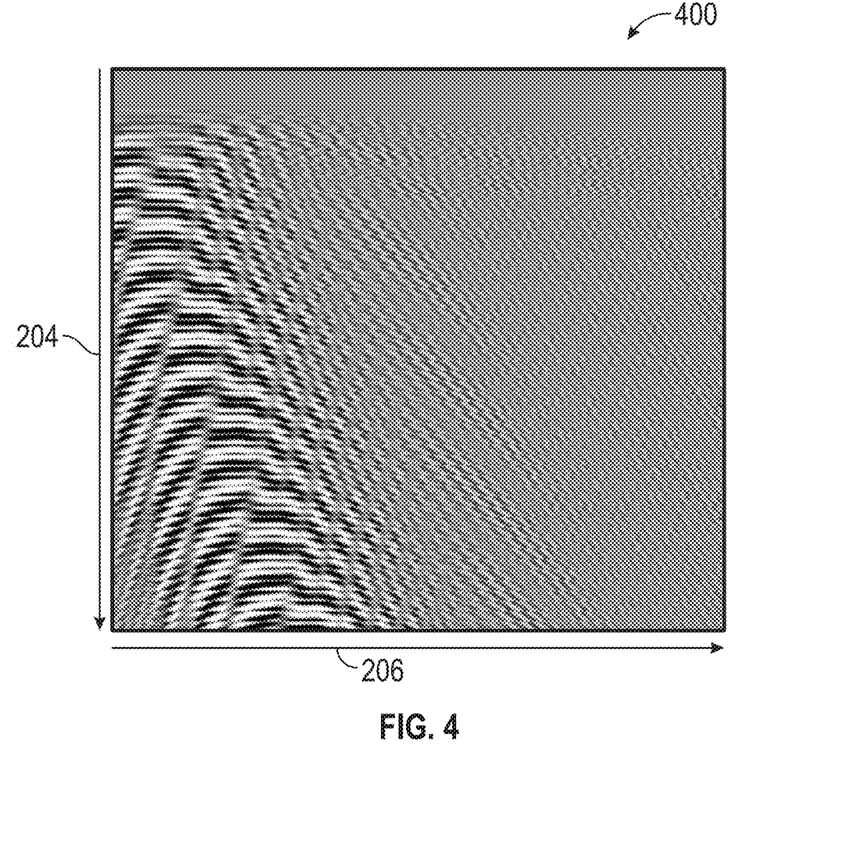
FIG. 4 displays a first processed seismic dataset in accordance with one or more embodiments.

FIG. 4 displays a first processed seismic dataset (400) determined in step 302 in accordance with one or more embodiments. The first processed seismic dataset (400) may be determined by removing direct waves (130) from the raw seismic dataset (202). As in FIG. 2B, the ordinate represents time (204) and the abscissa represents offset (206).

Figure 5A:
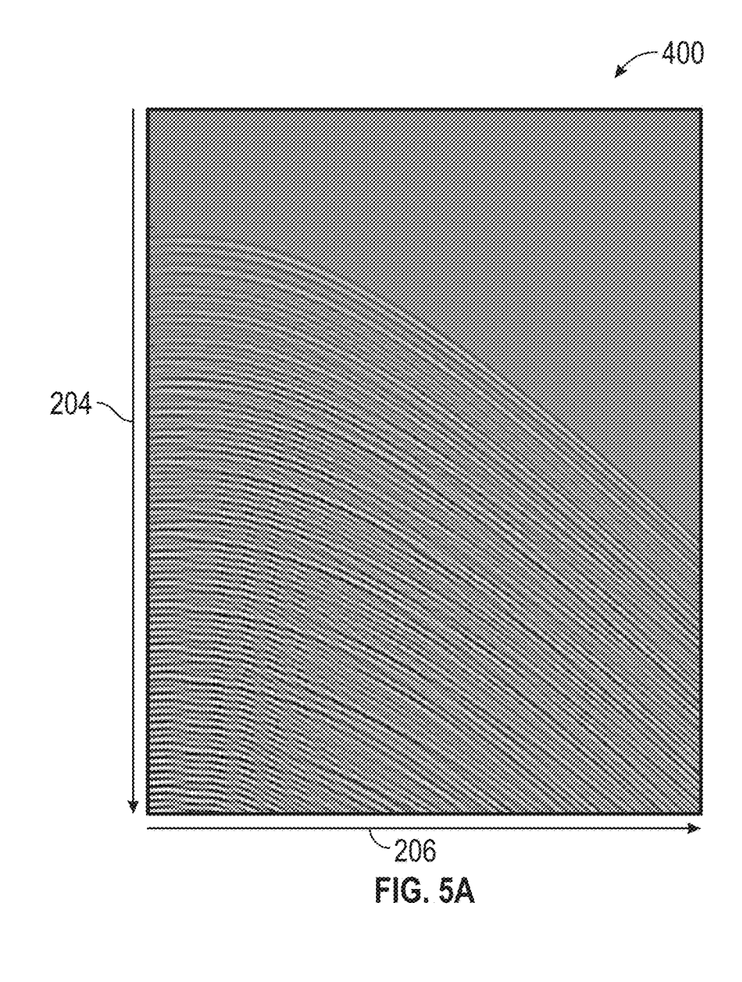
FIG. 5A displays a first processed seismic dataset in accordance with one or more embodiments.
Figure 5B:
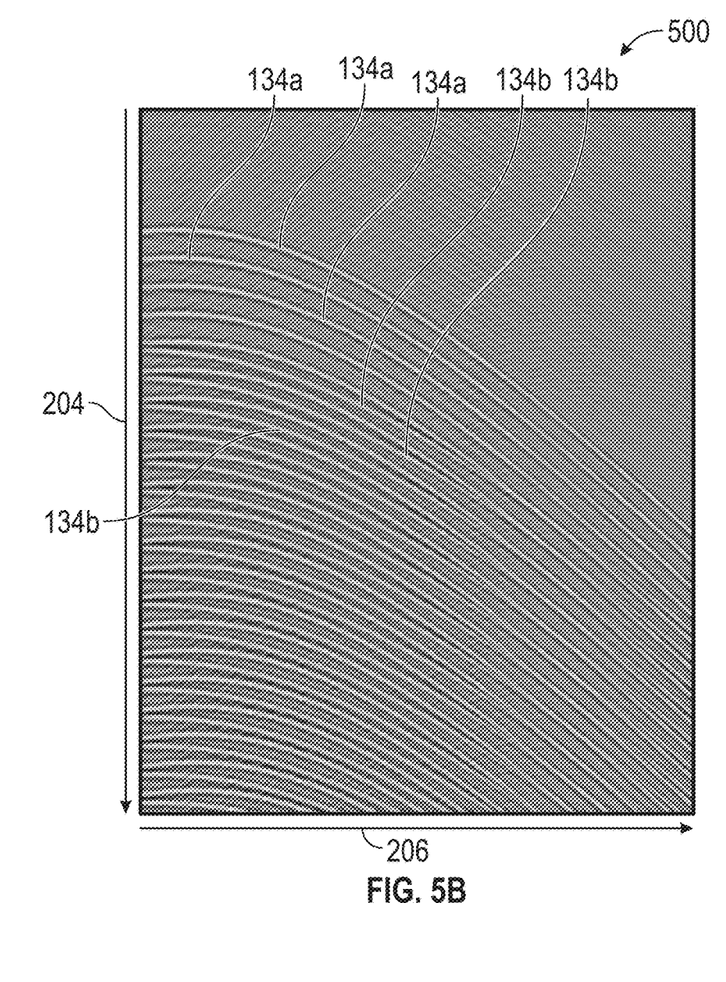
FIG. 5B displays a second processed seismic dataset in accordance with one or more embodiments.

FIG. 5A displays a portion of the first processed seismic dataset (400). FIG. 5B displays a portion of the second processed seismic dataset (500) determined in step 304 in accordance with one or more embodiments. For FIGS. 5A and 5B, the ordinate represents time (204) and the abscissa represents offset (206). The second processed seismic dataset (500) may be determined by deconvolving a seismic wavelet from the first processed seismic dataset (400).

Following deconvolution of a seismic wavelet, the second processed seismic dataset (500) presents a first set of reflected seismic waves (134a) that reflected at the dipped subterranean boundary (138a) and a second set of reflected seismic waves (134b) that reflected at the flat subterranean boundary (138b) within the model (200) displayed in FIG. 2A.

Figure 6:
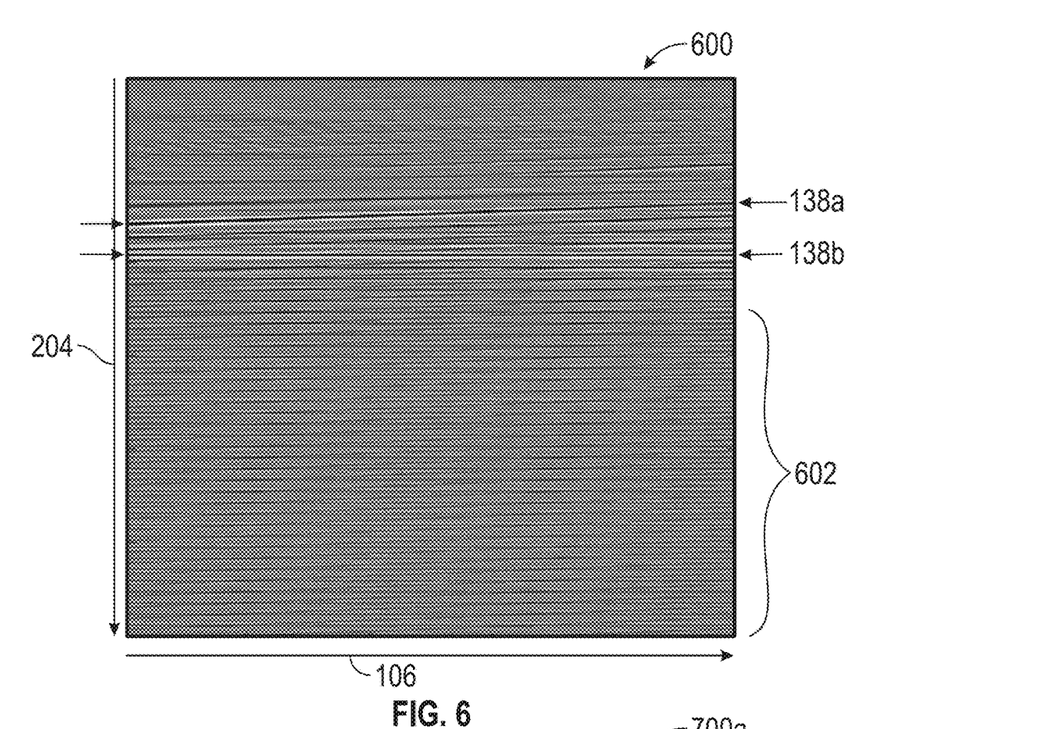
FIG. 6 displays a fourth processed seismic dataset in accordance with one or more embodiments.

FIG. 6 displays a fourth processed seismic dataset (600) determined in step 308 in accordance with one or more embodiments. The third processed seismic dataset (not shown) may be determined by correcting the second processed seismic dataset (500) for normal moveout. The fourth processed seismic dataset (600) may be determined by stacking the traces within the third processed seismic dataset. The ordinate represents time (204) and the abscissa represents the second axis (106). Unfocused manifestations of the dipped subterranean boundary (138a) and the flat subterranean boundary (138b) may now be apparent.

Figure 7:
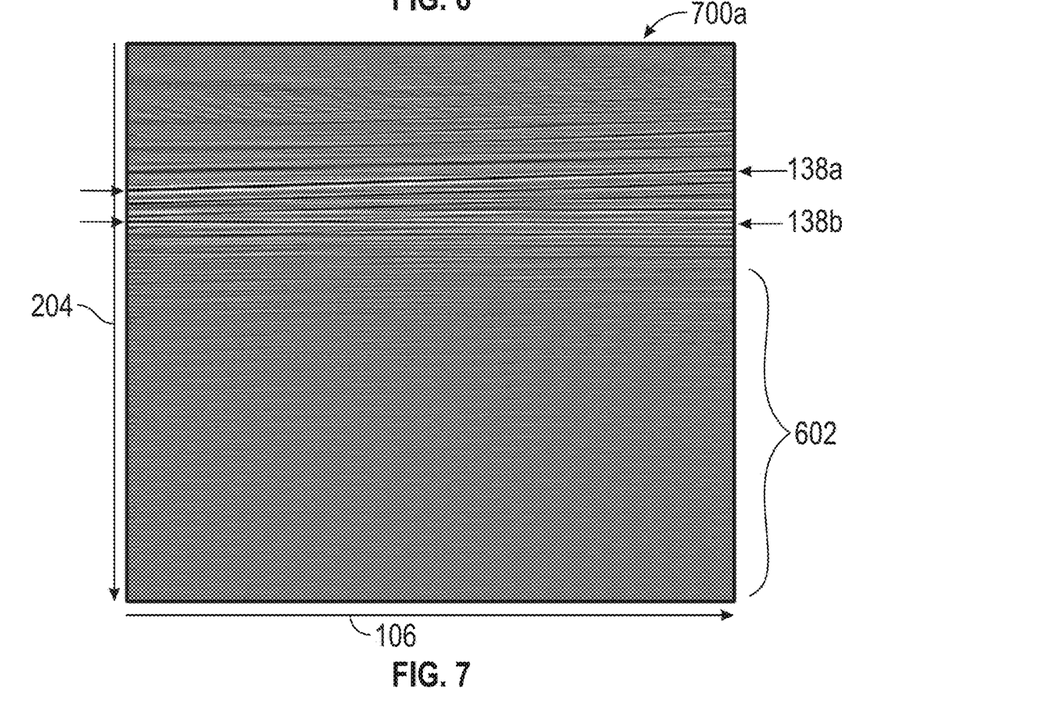
FIG. 7 displays a processed seismic dataset in accordance with one or more embodiments.

FIG. 7 displays a processed seismic dataset (700a) determined in step 310 in accordance with one or more embodiments. The ordinate represents time (204) and the abscissa represents the second axis (106). The processed seismic dataset (700a) may be determined by filtering the fourth processed seismic dataset (600) using frequency-wavenumber filtering.

The unfocused manifestations of the dipped subterranean boundary (138a) and flat subterranean boundary (138b) within the processed seismic dataset (700a) may be apparent to a person of ordinary skill in the art. However, artifacts (602), such as periodic noise, may still hinder the ability of a seismic interpreter to recognize clear, focused manifestations of the dipped subterranean boundary (138a) and the flat subterranean boundary (138b).

Figure 8:
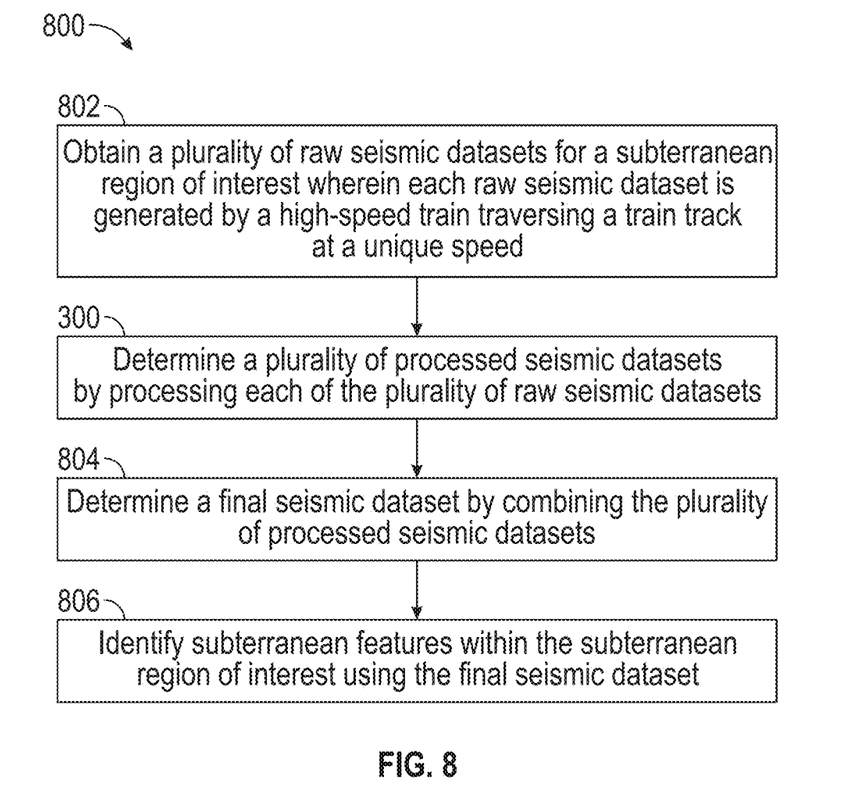
FIG. 8 shows a flowchart in accordance with one or more embodiments.

FIG. 8 shows a second seismic processing flowchart (800) in accordance with one or more embodiments. In step 802, a plurality of raw seismic datasets (202) is obtained for a subterranean region of interest (102). Each raw seismic dataset (202) within the plurality of raw seismic datasets (202) is generated by a high-speed train (110) traversing a train track (118) at a unique speed relative to the other raw seismic datasets (202) within the plurality of raw seismic datasets. For example, assume three raw seismic datasets (202) make up a plurality of raw seismic datasets (202). The first raw seismic dataset (202) may be generated from a high-speed train (110) traversing a train track (118) at 186 mph (300 km/hr); the second raw seismic dataset (202), 125 mph (200 km/hr); and the third raw seismic dataset (202), 249 mph (400 km/hr). Each unique speed may be an average speed for which the high-speed train (110) traversed a train track (118) within the subterranean region of interest (102).

Following step 802, each raw seismic dataset (202) is processed following the first seismic processing flowchart (300) presented in FIG. 3. Hereinafter, the first seismic processing flowchart (300) is synonymous with step 300 presented in the second seismic processing flowchart (800). To recapitulate, in step 300, each raw seismic dataset (202) may be processed to remove direct waves (130), deconvolve a seismic wavelet, correct for normal moveout, stack traces, and/or filter artifacts. Each of the plurality of raw seismic datasets (202) may be processed to determine a plurality of processed seismic datasets.

In step 804, the plurality of processed seismic datasets is combined to determine a final seismic dataset. In some embodiments, the plurality of processed seismic datasets may be combined by summing (i.e., stacking), weighted summing, or multiplying the plurality of processed seismic datasets together.

In step 806, the manifestation of subterranean features within the final seismic dataset is identified. Subterranean features include subterranean boundaries (138) and geologic structures, such as faults and anticlines.

Figure 9A:
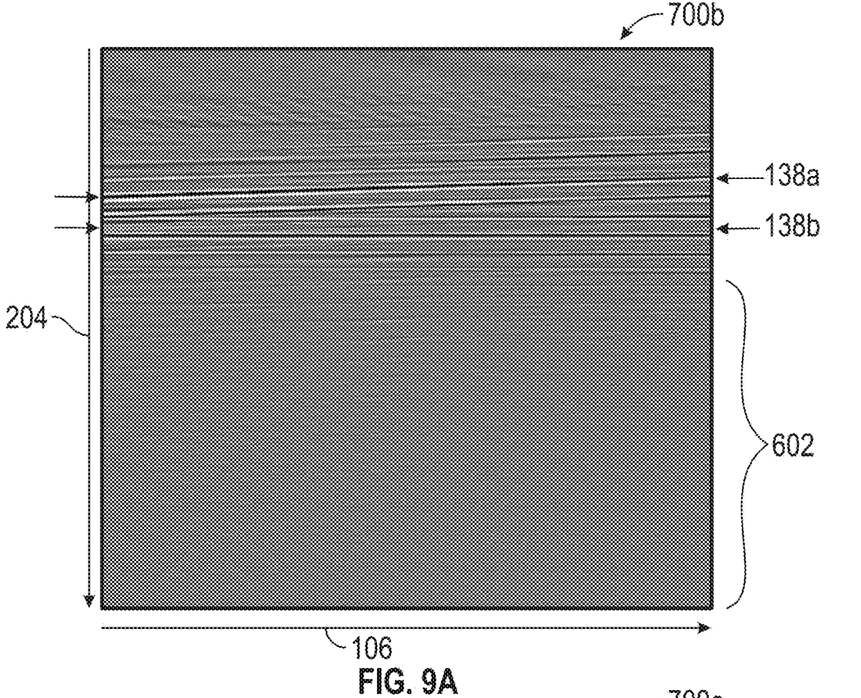
FIGS. 9A and 9B display processed seismic datasets in accordance with one or more embodiments.
Figure 9B:
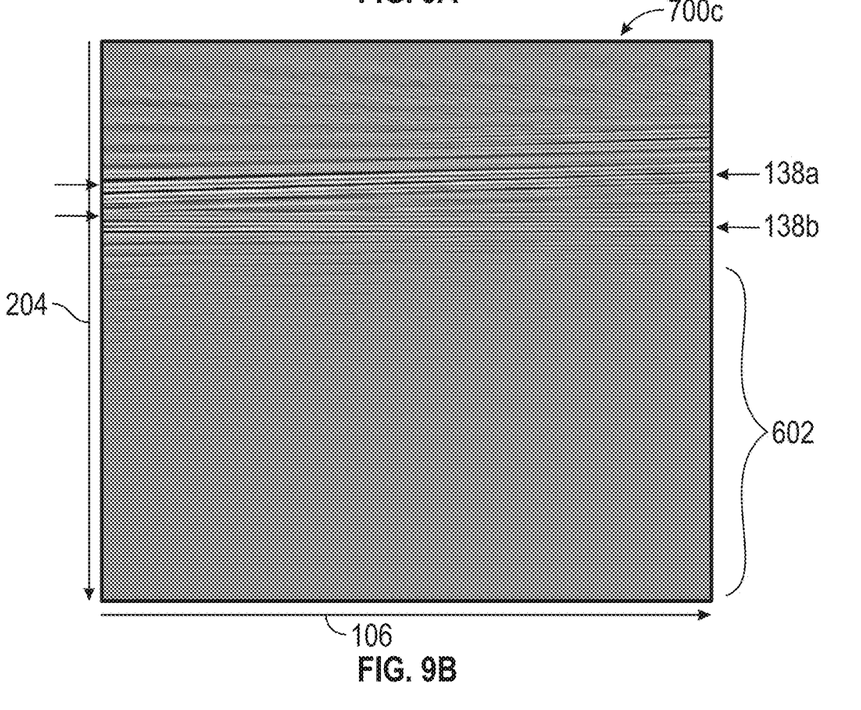

FIGS. 9A and 9B display processed seismic datasets (700b, 700c). FIGS. 9A and 9B assume a high-speed train (110) is traveling at 125 mph (200 km/hr) and 186 mph (400 km/hr), respectively. In FIGS. 9A and 9B, the ordinate represents time (204) and the abscissa represents the second axis (106). The processed seismic datasets displayed in FIGS. 7, 9A, and 9B may make up a plurality of processed seismic datasets (700a-c) in accordance with one or more embodiments. The processed seismic datasets (700a-c) displayed in FIGS. 7, 9A, and 9B present unfocused manifestations of the dipped subterranean boundary (138a) and the flat subterranean boundary (138b) at the same times (204). Alternatively, the artifacts (602) within the processed seismic datasets (700a-c) present at variable times (204).

Figure 10:
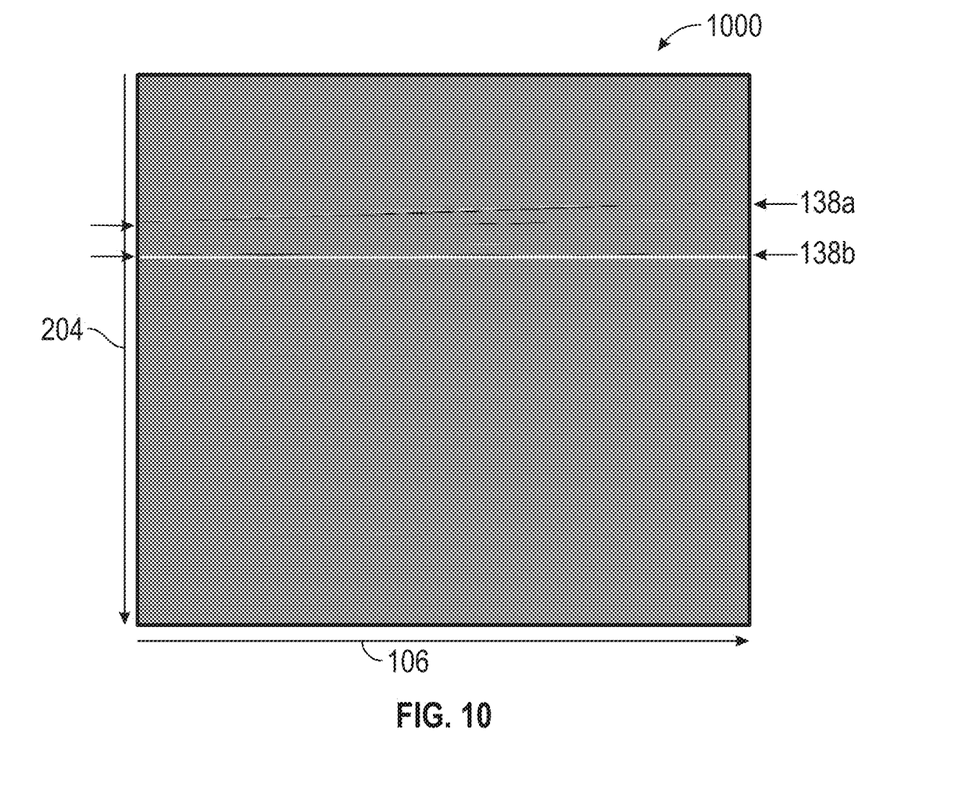
FIG. 10 displays a final seismic dataset in accordance with one or more embodiments.

FIG. 10 displays a final seismic dataset (1000) determined in step 804 in accordance with one or more embodiments. The ordinate represents time (204) and the abscissa represents the second axis (106). The final seismic dataset (1000) presents the clear, focused manifestations of subterranean features (i.e., the dipped subterranean boundary (138a) and the flat subterranean boundary (138b)) with minimal artifacts (602).

In some embodiments, certain subterranean features may indicate the presence of a hydrocarbon reservoir within the subterranean region of interest (102). For example, anticlines may trap hydrocarbons at their apex.

Figure 11:
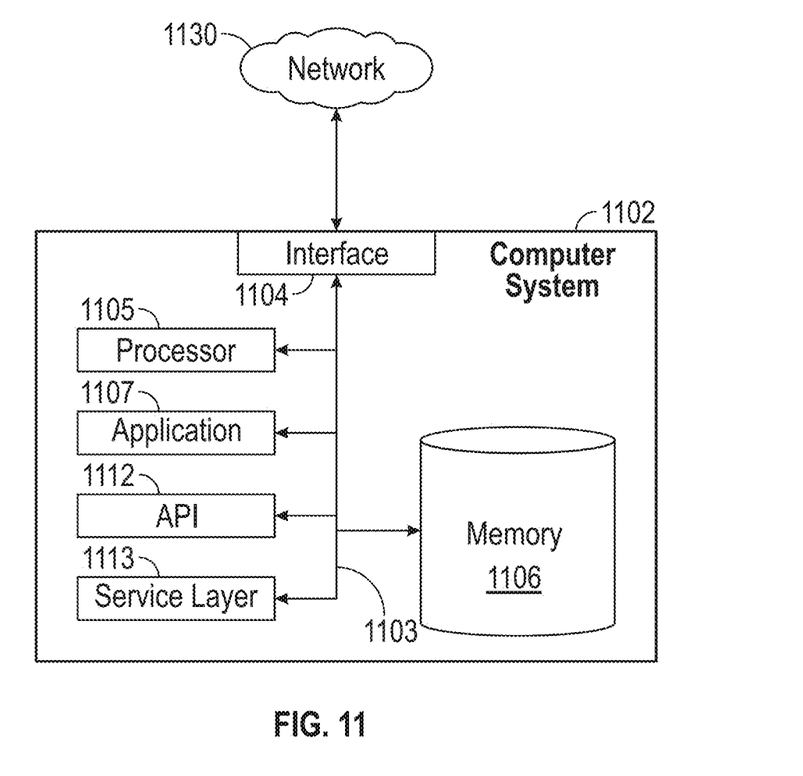
FIG. 11 shows computer systems in accordance with one or more embodiments.

FIG. 11 depicts a block diagram of a computer system (1102) in accordance with one or more embodiments. One computer system (1102) may be specifically configured for seismic processing and denoted a seismic processing system. Another computer system (1002) may be specifically configured for seismic interpretation and denoted a seismic interpretation workstation. Hereinafter, a computer system (1102) generically denotes a seismic processing system or a seismic interpretation workstation. Each computer system (1102) is intended to depict any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, each computer system (1102) may include an input device, such as a keypad, keyboard, touch screen, or other device that can accept user information, and an output device that displays information, including digital data, visual or audio information (or a combination of both), or a graphical user interface. Specifically, a seismic interpretation workstation may include a robust graphics card for the detailed rendering of a final seismic dataset (1000) that may be displayed and manipulated in a virtual reality system using 3D goggles, a mouse, or a wand.

Each computer system (1102) can serve in a role as a client, network component, server, database, or any other component (or a combination of roles) of a computer system (1102) as required for seismic processing and seismic interpretation. Each illustrated computer system (1102) is communicably coupled with a network (1130). For example, a seismic processing system and a seismic interpretation workstation may be communicably coupled using a network (1130). In some implementations, one or more components of each computer system (1102) may be configured to operate within environments, including cloud-computing-based, local, global, or other environment (or a combination of environments).

At a high level, each computer system (1102) is an electronic computing device operable to receive, transmit, process, store, and/or manage data and information associated with seismic processing and seismic interpretation. According to some implementations, each computer system (1102) may also include or be communicably coupled with an application server, e-mail server, web server, caching server, streaming data server, business intelligence (BI) server, or other server (or a combination of servers).

Because seismic processing and seismic interpretation may not be sequential, each computer system (1102) can receive requests over network (1130) from the other computer system (1102) or another client application and respond to the received requests by processing the requests appropriately. For example, a discontinuity interpreted as the manifestation of a subterranean feature within a final seismic dataset (1000) may be further processed to improve the focus of the subterranean feature. In addition, requests may also be sent to each computer system (1102) from internal users (for example, from a command console or by other appropriate access method), external or third-parties, other automated applications, as well as any other appropriate entities, individuals, systems, or computer systems (1102).

Each of the components of the computer system (1102) can communicate using a system bus (1103). In some implementations, any or all of the components of each computer system (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to each computer system (1102) or other components (whether or not illustrated) that are communicably coupled to each computer system (1102). The functionality of each computer system (1102) may be accessible for all service consumers using this service layer (1113). Software services, such as those provided by the service layer (1113), provide reusable, defined business functionalities through a defined interface. For example, the interface may be software written in JAVA, C++, or other suitable language providing data in extensible markup language (XML) format or another suitable format. While illustrated as an integrated component of each computer system (1102), alternative implementations may illustrate the API (1112) or the service layer (1113) as stand-alone components in relation to other components of each computer system (1102) or other components (whether or not illustrated) that are communicably coupled to each computer system (1102). Moreover, any or all parts of the API (1112) or the service layer (1113) may be implemented as child or sub-modules of another software module, enterprise application, or hardware module without departing from the scope of this disclosure.

Each computer system (1102) includes an interface (1104). Although illustrated as a single interface (1104) in FIG. 11, two or more interfaces (1104) may be used according to particular needs, desires, or particular implementations of each computer system (1102). The interface (1104) is used by each computer system (1102) for communicating with other systems in a distributed environment that are connected to the network (1130). Generally, the interface (1104) includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of each illustrated computer (1102).

Each computer system (1102) includes at least one computer processor (1105). Generally, a computer processor (1105) executes any instructions, algorithms, methods, functions, processes, flows, and procedures as described in the instant disclosure. A computer processor (1105) may be a central processing unit (CPU) or a graphics processing unit (GPU). A raw seismic dataset (202) may be hundreds of terabytes in size. To efficiently process the raw seismic dataset (202), a seismic processing system may consist of an array of CPUs with one or more subarrays of GPUs attached to each CPU. Further, tape readers or high-capacity hard-drives may be connected to the CPUs using wide-band system buses (1103).

Each computer system (1102) also includes a memory (1106) that holds data for each computer system (1102) or other components (or a combination of both) that can be connected to the network (1130). For example, memory (1106) can be a database storing data consistent with this disclosure. Although illustrated as a single memory (1106) in FIG. 11, two or more memories may be used according to particular needs, desires, or particular implementations of each computer system (1102) and the described functionality. While memory (1106) is illustrated as an integral component of each computer system (1102), in alternative implementations, memory (1106) can be external to each computer system (1102).

The application (1107) is an algorithmic software engine providing functionality according to particular needs, desires, or particular implementations of each computer system (1102), particularly with respect to functionality described in this disclosure. For example, application (1107) can serve as one or more components, modules, applications, etc. Further, although illustrated as a single application (1107), the application (1107) may be implemented as multiple applications (1107) on each computer system (1102). In addition, although illustrated as integral to each computer system (1102), in alternative implementations, the application (1107) can be external to each computer system (1102).

There may be any number of computer systems (1102) associated with, or external to, a seismic processing system and a seismic interpretation workstation, wherein each computer system (1102) communicates over network (1130). Further, the term "client," "user," and other appropriate terminology may be used interchangeably as appropriate without departing from the scope of this disclosure. Moreover, this disclosure contemplates that many users may use each computer system (1102), or that one user may use multiple computer systems (1102).

Figure 12:
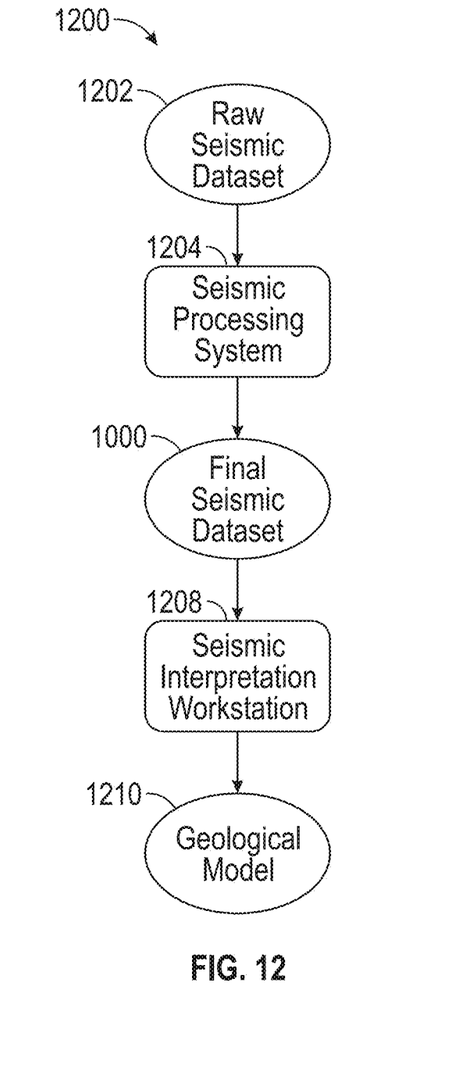
FIG. 12 shows a workflow in accordance with one or more embodiments.

FIG. 12 shows a workflow (1200) for processing and interpreting a raw seismic dataset (202) in accordance with one or more embodiments. A raw seismic dataset (202) may be acquired from a seismic survey (100). The seismic survey may be a surface seismic survey as described in FIG. 1 or a vertical seismic profile (VSP). The raw seismic dataset (202) may be input into, stored on, and processed using a seismic processing system (1204). Seismic processing may include attenuating artifacts and amplifying manifestations of subterranean features. For example, seismic processing may include the steps described in FIG. 3 such as removing direct waves, deconvolving a seismic wavelet, correcting for normal moveout, stacking traces, and/or filtering artifacts. Other seismic processing steps may be apparent to a person of ordinary skill in the art. The seismic processing system (1204) may produce a final seismic dataset (1000) that, when displayed as an image, may present the manifestation of subterranean features or seismic attributes. The final seismic dataset (1000) may be transferred to a seismic interpretation workstation (1208) through a network (1130). The seismic interpretation workstation (1208) may store the final seismic dataset (1000). The seismic interpretation workstation (1208) may allow a seismic interpreter to manually manipulate the final seismic dataset (1000) to identify and label subterranean features such as subterranean boundaries (138), faults, and anticlines. The seismic interpretation workstation (1208) may produce a geological model (1210), which may be the final seismic dataset (1000) including the characterized subterranean features.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method, comprising:
    performing a seismic survey of a subterranean region of interest comprising, for each unique speed among a plurality of unique speeds:
        traversing a high-speed train across a train track at each unique speed, wherein the train track is coupled to the subterranean region of interest,
        generating, using the high-speed train, seismic waves that propagate through the subterranean region of interest, and
        detecting and recording, by an array of receivers, the seismic waves as each raw seismic dataset among a plurality of raw seismic datasets,
    determining, using a seismic processing system, a plurality of processed seismic datasets by processing each raw seismic dataset,
    wherein processing each raw seismic dataset comprises:
        modeling a seismic wavelet based on a design of the high-speed train and each unique speed,
            wherein the design comprises a number of one or more carriages of the high-speed train and a number of wheels per each of the one or more carriages; and
        deconvolving the seismic wavelet from each raw seismic dataset,
    determining, using the seismic processing system, a final seismic dataset by combining the plurality of processed seismic datasets;
    identifying, using a seismic interpretation workstation, subterranean features within the subterranean region of interest using the final seismic dataset; and
    identifying, using the seismic interpretation workstation, a hydrocarbon reservoir based, at least in part, on the subterranean features.

2. The method of claim 1, wherein the train track comprises a plurality of piers coupling a track bed to the subterranean region of interest.

3. The method of claim 1, wherein each unique speed is greater than 200 kilometers per hour.

4. The method of claim 1, wherein processing each raw seismic dataset comprises:
    determining a first processed seismic dataset by removing direct waves from each raw seismic dataset;
    determining a second processed seismic dataset by correcting for normal moveout within the first processed seismic dataset;
    determining a third processed seismic dataset by stacking the second processed seismic dataset; and determining the plurality of processed seismic datasets by filtering the third processed seismic dataset for each raw seismic dataset.

5. The method of claim 4, wherein correcting for normal moveout is based, at least in part, on each unique speed.

6. The method of claim 4, wherein filtering comprises frequency-wavenumber filtering.

7. The method of claim 1, wherein determining the final seismic dataset comprises multiplication of the plurality of processed seismic datasets.

8. The method of claim 1, wherein the subterranean features comprise an anticline.

9. A system, comprising:
a seismic acquisition system configured to perform a seismic survey of a subterranean region of interest comprising, for each unique speed among a plurality of unique speeds:
a high-speed train configured to:
traverse a train track at each unique speed, wherein the train track is coupled to the subterranean region of interest; and
generate seismic waves that propagate through the subterranean region of interest, and
an array of seismic receivers configured to detect and record the seismic waves as each raw seismic dataset among a plurality of raw seismic datasets,
a seismic processing system configured to:
receive the plurality of raw seismic datasets,
determine a plurality of processed seismic datasets by processing each raw seismic dataset,
wherein processing each raw seismic dataset comprises:
modeling a seismic wavelet based on a design of the high-speed train and each unique speed, wherein the design comprises a number of one or more carriages of the high-speed train and a number of wheels per each of the one or more carriages, and
deconvolving the seismic wavelet from each raw seismic dataset; and
determine a final seismic dataset by combining the plurality of processed seismic datasets; and
a seismic interpretation workstation configured to:
identify subterranean features within the subterranean region of interest using the final seismic dataset, and
identify a hydrocarbon reservoir based, at least in part, on the subterranean features.

10. The system of claim 9, wherein the train track comprises a plurality of piers coupling a track bed to the subterranean region of interest.

11. The system of claim 9, wherein each unique speed is greater than 200 kilometers per hour.

* * * * *